UNITED STATES PATENT OFFICE.

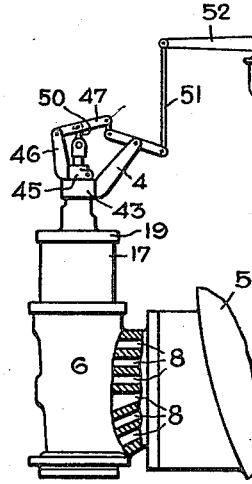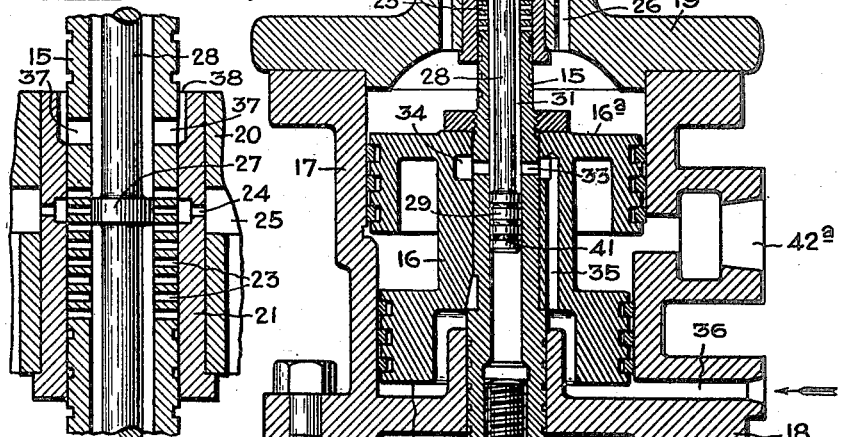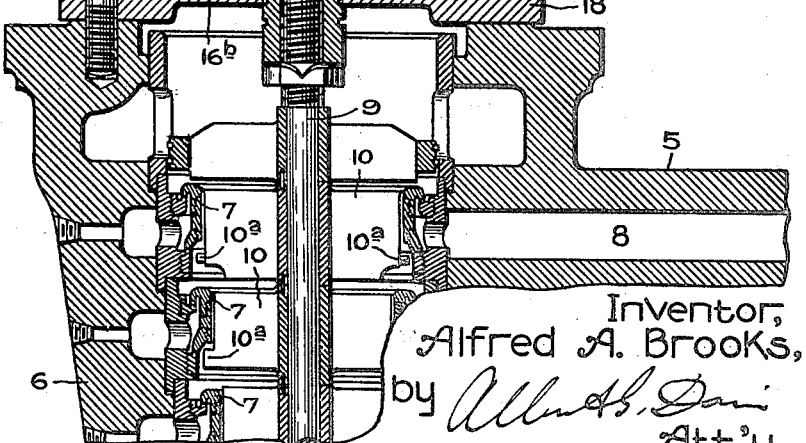

ALFRED A. BROOKS, OF WEST MEDFORD, MASSACHUSETTS, ASSIGNOR TO GENERAL ELECTRIC COMPANY, A CORPORATION OF NEW YORK.

VALVE-GEAR.

1,216,204.

Specification of Letters Patent.

Patented Feb. 13, 1917.

Application filed January 29, 1916. Serial No. 75,161.

*To all whom it may concern:*

Be it known that I, ALFRED A. BROOKS, a citizen of the United States, residing at West Medford, in the county of Middlesex, State of Massachusetts, have invented certain new and useful Improvements in Valve-Gears, of which the following is a specification.

The present invention relates to valve gears for elastic fluid turbines, and is particularly intended for controlling admission valve mechanisms of the general type which comprise a plurality of valves which are successively opened and closed to regulate the admission of the motive fluid.

The primary object of my invention is to provide an improved fluid operated valve gear which will effectually prevent throttling.

For a consideration of what I believe to be novel and my invention, attention is directed to the accompanying description and the claims appended thereto.

In the accompanying drawing wherein I have illustrated one form which my invention may take, Figure 1 is a view partly in section of a portion of an elastic fluid turbine with my improved valve gear mounted thereon and connected with a speed governor; Fig. 2 is a sectional view on a larger scale than Fig. 1 of the valve gear; and Fig. 3 is a sectional view of a portion thereof.

Referring to the drawing, 5 indicates a portion of an elastic fluid turbine and 6 a valve mechanism for controlling the admission of elastic fluid thereto. In the present instance the valve mechanism is shown as comprising a plurality of annular valves 7 each of which controls a passage 8 leading to a nozzle or set of nozzles of the machine. 9 is a spindle extending down through the annular valves, and 10 are lifters fixed to the spindle and suitably spaced apart and provided with ears 10$^a$ adapted to engage the valves 7 so that as the spindle is raised and lowered it will successively unseat and seat the valves. It will be understood, however, that my invention is not limited to this specific type of valve mechanism.

Connected with the upper end of the valve stem 9 is a tubular sleeve 15 to which is rigidly fixed a piston 16 which slides in a cylinder 17 mounted on, and preferably formed integral with, the cover 18 of the valve mechanism. The piston 16 is a differential one, the upper surface 16$^a$ being of greater area than the lower surface 16$^b$. The cylinder head 19 of cylinder 17 has a tubular extension 20 in which are inserted the linings 21 and 22 which may be formed in one piece, and through which projects the sleeve 15. The sleeve 15 is provided with a series of spaced ports 23 which are adapted to be brought into registry with openings 24 in the lining 21, which openings communicate with an annular space 25 which is connected with the cylinder 17 above the piston 16 by a passage or passages 26. The ports 23 are controlled by a valve 27 mounted between the ends of a valve stem 28. This valve is of such width, as will be seen from Fig. 3, that when moved in either direction, it always covers the next adjacent port before it uncovers the port it then closes. The valve stem 28 is of lesser diameter than the bore of sleeve 15 except at its two ends where it is provided with enlarged heads 29 and 30 which have a sliding fit with the sleeve. This provides annular spaces 31 and 32 which surround the stem 28 below and above the valve 27. The annular space 31 is connected by an opening or openings 33 in sleeve 15 with an annular groove 34 which in turn is connected by passage 35 in the piston 16 to the cylinder space below such piston. Leading to the cylinder space below the piston is an inlet passage 36 to which may be connected a suitable pipe for conveying fluid to the mechanism for operating it. The annular space 32 is connected by ports 37, passage 38, and annular groove 39 to an outlet opening 40 through which the operating fluid is discharged. It will be understood that suitable piping may be connected with this discharge opening to convey the discharged fluid to any desired point. The heads 29 and 30 and the sleeve 15 are provided with annular packing grooves 41 as shown to prevent leakage. 42 are passages for conveying any leakage past the parts located above the discharge opening 40 back to such opening, and 42$^a$ is an opening between the two parts of the piston for conveying away any fluid which may leak past the piston packings.

Fixed to the upper end of the tubular extension 20 is a collar 43 carrying an arm 44, and fixed to the upper end of the sleeve 15 is a collar 45 carrying an arm 46. It will thus be seen that the collar 43 and arm 44 are stationary, while the collar 45 and arm 46 move with the sleeve 15. 47 is a floating lever which is pivoted at one end to arm 46 and at the other to one end of a lever 48 pivoted on arm 44, the pivotal connection between levers 47 and 48 being through a link 49. 50 is a link connecting the valve stem 28 to floating lever 47 at a point between its ends, and 51 is a rod connecting the other end of lever 48 to governor lever 52 of speed governor 53 which controls the valve gear, it being understood that the governor is driven from the turbine shaft in the usual manner. The leverage arrangement for connecting the valve gear to the governor as just described may of course be varied to suit any particular condition met with.

The operation is as follows: Assume that the machine is running and the parts are in the position as shown in Fig. 2. If now a decrease in speed occurs indicating an increase in the load the governor will act through the rod 51 and the lever 48 to pull down the right-hand end of lever 47 and lower the valve stem 28. When moved sufficiently the valve 27 will cover the next lower port 23 and uncover the port 23 which is in line with the openings 24, and which it now covers. This then permits elastic fluid to escape from the cylinder space above piston 16 through passage 26, annular space 25, openings 24, ports 23, annular space 32, ports 37, annular groove 39 and outlet opening 40. This relieves the pressure above the piston 16, and the motive fluid which enters below it by way of passage 36 will then operate to raise it. As the piston 16 rises, it carries with it the sleeve 15 and also the valve stem 28 and valve 27 since the collar 45 and arm 46 move with the sleeve. The lever 47 will, during this movement, pivot on the link 49. It will thus be seen that during this movement the valve 27 moves downward relatively to the sleeve 15 and upward relatively to the tubular extension 20. These movements are such that when the upper port 23 has risen so that it is no longer in communication with openings 24 the valve 27 has returned to its original position and the lower port 23, which the valve 27 now covers, has been brought into line with the openings 24. The sleeve 21 then cuts off the further escape of fluid above the piston 16, through the upper port 23 while the valve 27 prevents it through the lower one thus bringing the piston to rest. This movement is sufficient to completely open a valve 7. If now a further increase in load takes place, the operation is repeated, the sleeve 15 being lifted again by a certain specified amount, which amount will be sufficient to just open another of the valves 7. In case of an increase in speed indicating a diminution in the load, the operation is in the reverse direction as will be obvious, it being remembered that the piston surface $16^a$ is larger than the piston surface $16^b$ so that the fluid pressure when it enters above it by way of inlet passage 36, passage 35, annular groove 34, openings 33, annular space 31, port 23, openings 24, annular groove 25 and passage 26 will be able to force the piston downward, thereby moving the valve mechanism by an amount sufficient to completely close one of the valves 7. It will thus be seen that a movement in either direction of the mechanism is just sufficient to either completely open or completely close one of the valves. By this means I avoid any throttling action on the part of the valve which at any time is being opened or closed for regulating the engine. That is, considering for example, that the load is such that it requires three valves to be opened and a fourth one to be opened partially, then it may be considered that at this time the fourth valve is doing the regulating. This fourth valve, however, will never occupy any intermediate positions where it would produce a throttling action, but it will be first completely opened and then completely closed, the regulation thus being produced by the complete opening and closing of said valve. It will be clear that the piston 16 and cylinder 17 form a fluid operated motor, and that the valve 27 and associated parts form the pilot valve mechanism for controlling the motor, such parts being well known in connection with apparatus of this general type. In the present instance the fluid motor and its pilot valve mechanism are mounted in vertical alinement with the valve stem but it will be understood that my invention is not necessarily limited to this arrangement.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with an elastic fluid turbine having a plurality of valves which are successively opened and closed for regulating it, of a fluid motor for operating the valves, and a pilot valve mechanism for controlling the admission of actuating fluid to it, said pilot valve mechanism being arranged to cause the motor to move an amount sufficient to either completely open or completely close one of the regulating valves at each actuation.

2. The combination with an elastic fluid turbine having a plurality of valves which are successively opened and closed for regulating it, of a fluid motor for operating the valves, and a pilot valve mechanism for controlling the admission of actuating fluid to it, said pilot valve mechanism having a sliding sleeve which is connected to move with the fluid motor and has a plurality of spaced ports therein, a valve which controls said ports, and a stem connected to the valve; and means for moving said stem.

3. The combination with a regulating valve mechanism of a fluid actuated motor for moving it predetermined amounts, and a pilot valve mechanism controlling said motor comprising a sleeve which moves with the regulating valve mechanism and has spaced ports therein, a valve which controls said ports, a stem for the valve, and means for moving the stem comprising a lever connected therewith and pivoted on the sleeve.

4. The combination with a regulating valve mechanism, of a fluid motor for moving it predetermined amounts, and a pilot valve mechanism controlling said motor comprising a casing, a sleeve in the casing which is connected to the moving element of the fluid motor and has spaced ports therein through which actuating fluid may be admitted to or permitted to escape from the fluid motor, a valve controlling said ports, a stem connected to the valve, a lever to which the stem is connected, said lever being pivoted on the sleeve, and means for moving the lever.

5. The combination with an elastic fluid turbine, of a plurality of valves which are successively opened and closed for controlling the admission of motive fluid thereto, a fluid actuated motor having its movable element connected to the valves, and a pilot valve mechanism for regulating the admission of actuating fluid to the motor to cause it to move predetermined distances to successively open and close said controlling valves, said pilot valve mechanism comprising a casing having a port therein connected with the fluid motor, a sliding sleeve in the casing which moves with the controlling valves and has a plurality of spaced ports adapted to successively register with the port in said sleeve, a valve for controlling the ports in the sleeve, a stem connected thereto, a lever to which the stem is connected, said lever being pivoted on the sleeve, and means responsive to the load on the turbine for moving said lever.

6. The combination with an elastic fluid turbine having a plurality of regulating valves which are successively opened and closed, of a fluid actuated motor for moving the valves comprising a cylinder and a piston therein, a pilot valve casing mounted on the motor casing, a sliding sleeve therein which is connected to the piston and has a plurality of spaced ports through which actuating fluid may pass to and from the motor cylinder, a valve in the sleeve controlling said ports, a valve stem for the valve, a fulcrum on the sleeve, a lever pivoted on the fulcrum to which the valve stem is connected, and means responsive to the load on the turbine for moving the lever.

7. The combination with an elastic fluid turbine having a plurality of valves which are successively opened and closed for regulating it, of a fluid motor for operating the valves, and a pilot valve mechanism for controlling the admission of actuating fluid to it, said pilot valve mechanism comprising means so arranged that before actuating fluid is admitted to the motor, the pilot valve must be moved an amount in either direction sufficient to cause the motor to either completely open or completely close a regulating valve.

8. The combination with an elastic fluid turbine having a plurality of valves which are successively opened and closed for regulating it, of a fluid motor for operating the valves, and a pilot valve mechanism for controlling the admission of actuating fluid to it, said pilot valve mechanism comprising a sliding sleeve which moves with the fluid motor and has a plurality of spaced ports, and a valve which controls said ports and is wide enough to cover two of them.

9. The combination with an elastic fluid turbine having a plurality of valves which are successively opened and closed for regulating it, of a fluid motor for operating the valves, and a pilot valve mechanism for controlling the admission of actuating fluid to it, said pilot valve mechanism comprising a sleeve having spaced openings therein, and a valve coöperating therewith, said sleeve and valve being so connected to the motor that the valve may be moved relative to the sleeve, and, when the motor operates, it moves both the valve and sleeve with it.

In witness whereof, I have hereunto set my hand this 27th day of January, 1916.

ALFRED A. BROOKS.

Copies of this patent may be obtained for five cents each, by addressing the "Commissioner of Patents, Washington, D. C."